United States Patent [19]

Cohen

[11] Patent Number: 5,056,908
[45] Date of Patent: * Oct. 15, 1991

[54] OPTIC ZONE PHASE CHANNELS

[76] Inventor: Allen L. Cohen, 10010 Walsham Ct., Richmond, Va. 23233

[*] Notice: The portion of the term of this patent subsequent to Nov. 21, 2006 has been disclaimed.

[21] Appl. No.: 438,321

[22] Filed: Nov. 20, 1989

Related U.S. Application Data

[63] Continuation of Ser. No. 120,265, Nov. 12, 1987, Pat. No. 4,881,804.

[51] Int. Cl.$^5$ .......................... G02C 7/04; G02B 5/18; G02B 27/44; A61F 2/16
[52] U.S. Cl. ...................................... 351/161; 623/6; 359/565; 359/571
[58] Field of Search ............... 351/160 R, 160 H, 161, 351/162; 623/6; 350/162.16, 162.22, 162.20, 162.21

[56] References Cited

U.S. PATENT DOCUMENTS

| | | | |
|---|---|---|---|
| 4,637,697 | 1/1987 | Freeman | 350/162.16 X |
| 4,881,804 | 11/1989 | Cohen | 351/161 |
| 4,895,750 | 1/1990 | Swanson et al. | 350/162.2 X |

*Primary Examiner*—Scott J. Sugarman
*Attorney, Agent, or Firm*—Finnegan, Henderson, Farabow, Garrett & Dunner

[57] ABSTRACT

An ophthalmic contact lens with a phase plate and a pure refractive portion within its optic zone. The invention embraces an ophthalmic contact lens of the Cohen lens design with a phase plate and a pure refractive portion within its optic zone.

12 Claims, 4 Drawing Sheets

Lens with no drapage

Lens undergoing drapage

OPTIC ZONE PHASE CHANNELS

This is a continuation of application Ser. No. 07/120,265, filed Nov. 12, 1987, now U.S. Pat. No. 4,881,804.

RELATED APPLICATIONS

This application is related to the following commonly assigned applications, filed on even date herewith:

U.S. Ser. No. 120,262, now U.S. Pat. No. 4,881,805 and U.S. Ser. No. 120,263, now abandoned.

BRIEF DESCRIPTION OF THE INVENTION

An ophthalmic contact lens with a phase plate and a pure refractive portion within its optic zone.

BACKGROUND TO THE INVENTION

This invention relates to an improvement in contact lenses and intraocular lenses possessing phase plate optics. A "phase plate", as employed herein and in the claims, is a unitary optical region of a lens utilizing the combination of a zone plate and optical facets in the zones said combination diffracts light to produce a specific wavefront which results in a specific intensity distribution of light at the various order (e.g., $0^{th}$, $1^{st}$, etc.) foci of the zone plate.

This invention concerns contact lenses, and more particularly contact lenses utilizing phase plate optics, such as phase plate bifocals and "tuned" Fresnel lenses making use of concentric annular zones. Such lenses generally follow the designs described, for example, by Allen L. Cohen in U.S. Pat. Nos. 4,210,391; 4,338,005; and 4,340,283. The lens design of Cohen, supra, provides that the radii "r" of the annular and concentric zones are substantially proportional to $\sqrt{n}$ and that the zones are cut so as to direct light to more than one focal point (herein called a "Cohen lens design").

The Cohen lens design with phase plate optics allows lens constructions which are exceptionally thin. Contact lenses may be designed with phase plate optics in order to achieve a bifocal or multifocal effect. The specific chromatic properties of a phase plate may be incorporated in the design of a contact lens including a contact lens having multifocal properties.

It has been determined that contact lenses with phase plate optics can generate some problems for the wearer. One is the glare that can result from the non-optical edges of the steps between the annularly arranged eshelettes that make up a phase plate and appears through wave interference as a disconcerting, intense light to the contact lens user.

Another potential problem stems from (i) the need in soft contact lenses to have sufficient mobility in the lens' fit to the cornea to allow tear fluid exchange to cleanse the surface of the eye of metabolic waste and (ii) the inability of the soft lens to move sufficiently during wearing to satisfy that needed mobility.

The provision of a multiplicity of multifocal Fresnel eshelettes in the annular zone plate arrangement of the Cohen lens design in a soft contact lens tends to limit the mobility of the lens. It would be desirable to incorporate into the design of such lenses sufficient mobility that the lens has the capacity of moving about 0.5 to about 1 millimeter of distance during wearing. This would enhance the lens' ability to allow management of the buildup of metabolic waste under the lens.

It is the intent of this invention, amongst other things, to provide a multifocal contact lens design encompassed within the annular arrangement of the Cohen patents, supra, which minimizes the effects of glare from the non-optical edges and/or possesses the requisite mobility during use, as characterized above. The invention achieves these results and affects the multifocal utility of a lens with the aforementioned annular arrangement.

THE INVENTION

This invention is directed to an ophthalmic lens such as a contact or intraocular lens, with a phase plate and a pure refractive portion within its optic zone.

More particularly, this invention is directed to an ophthalmic contact lens of the Cohen lens design with a phase plate and a pure refractive portion within its optic zone.

The term "pure refractive portion", as used herein and in the claims, means one or more areas of the lens which operate in accordance with the Fundamental Laws of Geometrical Optics, see Fincham et al., *Optics*, 9th Ed., page 22[1]. These lens areas are typified by smooth or relatively smooth anterior and posterior surfaces. Hereinafter, the pure refractive portion may be referred to as a "channel", "pure refractive channel" and "phase channel."

[1]. "Geometrical optics, ignoring diffraction effects due to the wave nature of light, assumes:
(1) Neighbouring rays of light are independent of one another.
(2) The propagation of light is rectilinear, i.e., light travels in straight lines.
(3) Law of reflection.
(4) Law of refraction."

In a preferred embodiment of the invention, the pure refractive portion contributes to a focal power of the phase plate.

In a further embodiment, this invention is directed to a multifocal lens of the Cohen lens design containing a phase plate and a pure refractive portion which symmetrically retards the light passing therethrough (hereinafter termed for convenience "symmetrical channel").

The symmetrical channel diffracts light to constructively interfere with the light waves of the phase zone plate(s) to form or enhance an image at a desired focal point. The symmetrical channel may be regarded as providing essentially monofocal capabilities.

In a preferred embodiment, the phase plate portion is located centrally and the pure refractive portion forms the remaining peripheral annular portion of the optic zone. In a more preferred embodiment of the invention, the pure refractive portion is displaced from the base curve of the lens so as to form a pure refractive channel. In the more preferred embodiment, the pure refractive channel is designed to parallel the base curve of the contact lens and focuses light at the zeroth ($0^{th}$) diffractive focal point of the phase plate portion of the optic zone.

In the most preferred embodiment of the invention, the phase plate occupies the central portion of the optic zone and the phase plate is designed with half-wave eshelettes so as to split light equally between the zeroth ($0^{th}$) and first ($1^{st}$) order diffractive focal points. This is a convenient way to employ the Cohen lens design by providing each plate zone with multifocal capacity and relying on a plurality of them in conjunction with wave interference to achieve multi-focalization. In the most favorable aspect of the most preferred embodiment, the pure refractive channel is located peripherally of the phase plate and set at a quarter-wave depth below the base curve.

In practicing preferred embodiments of the invention, a transition zone may be placed at the juncture between the pure refractive channel and the phase plate, and the peripheral end of the annular refractive channel is left open so as to allow the lens to drape to the eye.

DETAILED OF THE INVENTION

Figure 1:
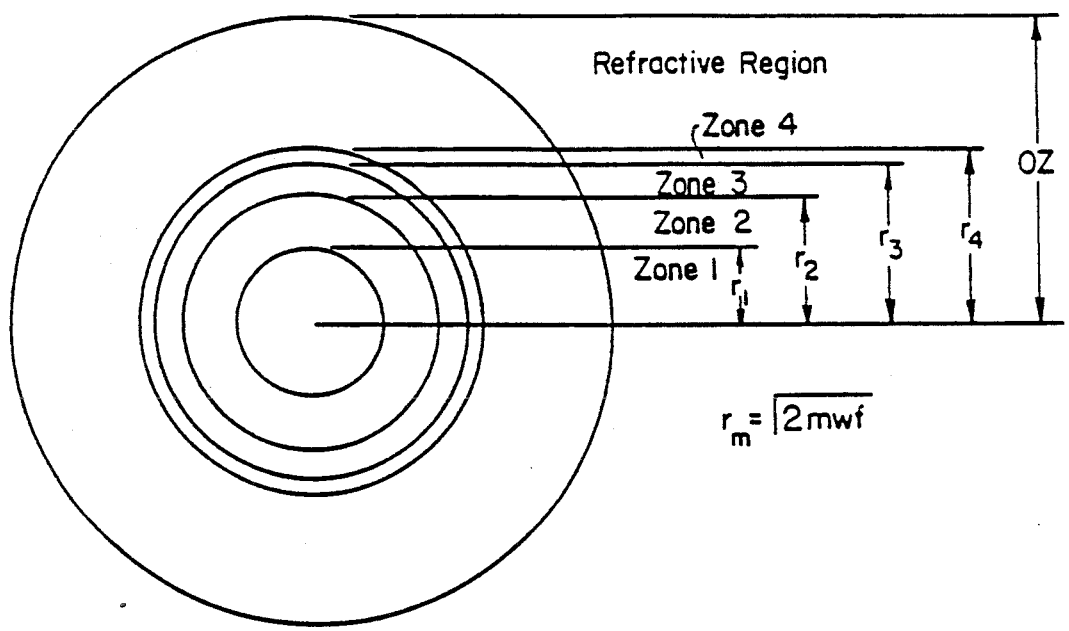
FIG. 1 depicts a frontal view of a contact lens containing an optic zone, "OZ", which comprises a central phase plate with four zones and a peripheral refractive region.

This invention relates to contact lenses specifically designed with phase plate optics located within an area smaller than the optics zone of the lens. This can be initially demonstrated by the lens of FIG. 1, which breaks down the designated optics zone OZ into four (4) annular zones ($r_1$, $r_2$, $r_3$ and $r_4$) and a peripherally placed annular refractive region. The benefits from this geometric configuration of the optics zone of a contact lens is less glare being transmitted to the user,
   improved mobility characteristics for the lens, and
   added refractive power to the phase plate power.

The radii relationship of the phase plate zones follows the characterizations of the Cohen lens design, to wit:

$$r_m = \sqrt{2mwf}$$

m = integer representing the $m^{th}$ zone
w = the wavelength of light
f = focal length of $1^{st}$ order diffraction.

Figure 2:
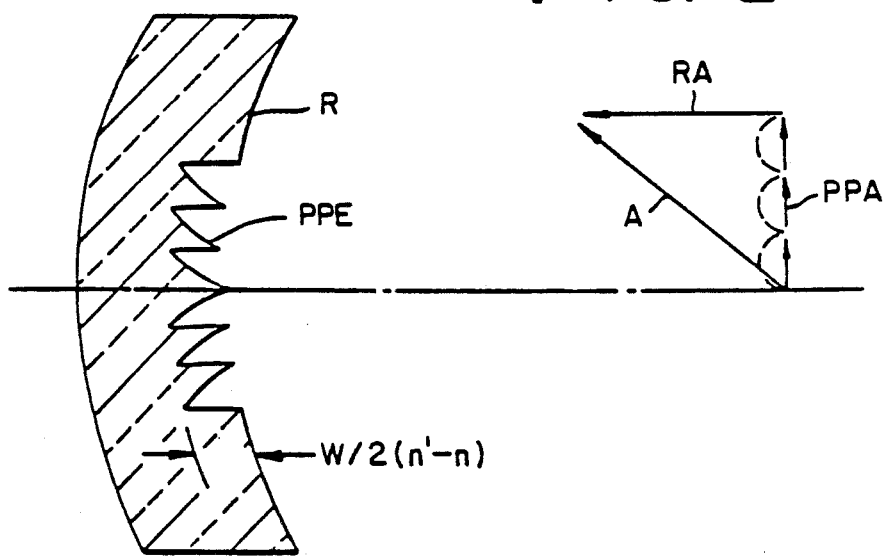
FIG. 2 depicts a cross-sectional side view of a contact lens having an optic zone which contains annular phase plate eshelettes, "PPE" cut into the central portion of its base curve, and a peripheral annular refractive portion, "R". It also depicts the resultant vector amplitudes at the zeroth ($0^{th}$) order focal point.

The contact lens of FIG. 2 has a continuous half-wave phase plate in the central region of the optic zone. This is a bifocal and splits the light equally between zeroth ($0^{th}$) and first ($1^{st}$) order diffraction. The depth "h" of the zone plate eshelettes is given as $$h = w/2(n' - n)$$

n' = refractive index of contact lens
n = refractive index of tear layer of eye

Further, the pure refractive region R of this lens continues with the same base curve as the phase plate portion, thereby focussing light toward the zeroth ($0^{th}$) diffractive focus of the phase plate.

As a general rule, when lenses are constructed with an optic zone larger than the area containing the phase plate optics, the refracted and diffracted light will undergo interference at the focal point or points of the lens. This can result in some cases in a degrading of the focussed images. This is demonstrated by FIG. 2 where the amplitudes PPA formed by the phase plate eshelettes PPE results in the amplitude RA formed by the refractive region R which is 90 degrees out of phase and results in the composite amplitude A.

In a preferred embodiment of the invention, where a contact lens incorporates both a phase plate as well as a pure refractive channel within its optic zone, it is desirable to alter the channel to enhance rather than degrade a phase plate image.

In the typical embodiment of the invention, the resultant phases of the various zones of the lens are aligned to achieve maximum constructive interference. For example, they may be arranged annularly as to each other, and such configuration may be changed to compensate for the shape of the lens and variations in the optic zone from the traditional variations so long as the objectives of the invention are achieved.

A product of the invention serving to enhance focussed images and obtaining the other benefits of the invention, utilizes a symmetrical channel resulting in the alignment of its phase with the resultant phase of one of the phase plate focal points. The resulting lens containing this embodiment is provided with a phase plate with an adjacent pure refractive channel that alters by virtue of symmetrical phase shift the phase relationship existing between the phase plate and channel.

The channel desirably focuses light to ameliorate the impeding effects of the refracted and diffracted light. Such a channel may be located interior or exterior of the phase plate zone and the pure refractive surface.

Figure 3:
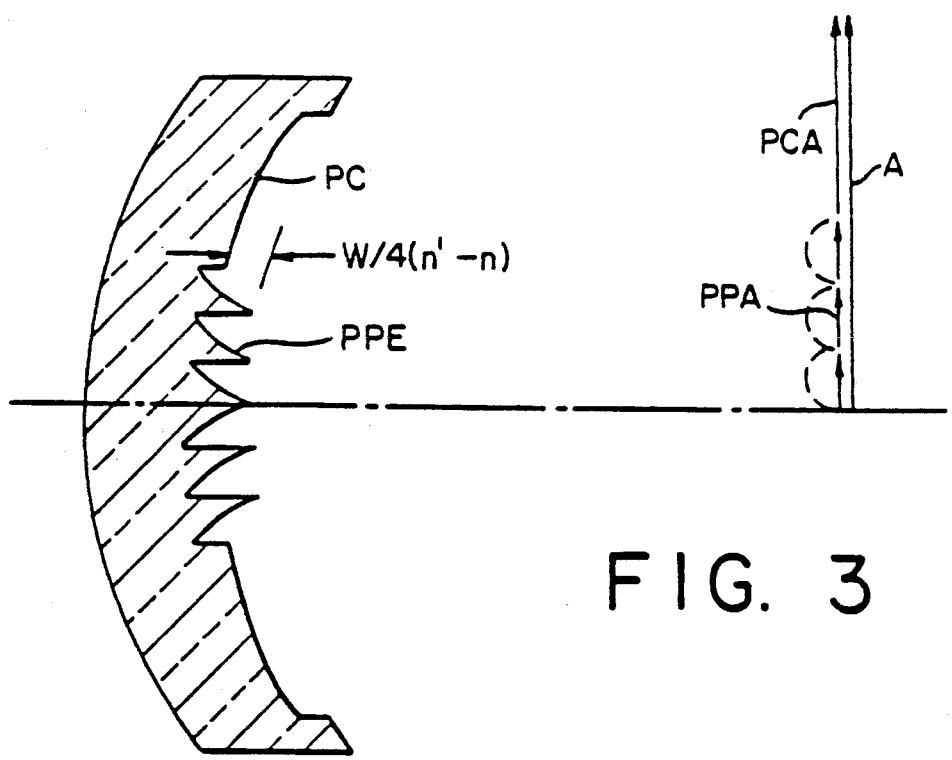
FIG. 3 depicts a cross-sectional side view of a contact lens having an optic zone which contains annular phase plate eshelettes "PPE" cut into the central portion of its base curve, and a peripheral annular refractive portion in the form of a phase channel, "PC". It also depicts the resultant vector amplitudes at the zeroth ($0^{th}$) order focal point.

FIG. 3 illustrates a lens designed with a phase channel to provide the aforementioned symmetrical phase shift enhancement to align the phases between the pure refractive and phase plate portions of the optic zone. In FIG. 3, the amplitudes PPA formed by the phase plate eshelettes PPE, and the amplitude PCA formed by the pure refractive phase channel PC are approximately in phase and result in the composite amplitude A. The phases were brought into alignment by placing the phase channel at a depth of $w/4(n'-n)$ above the base curve of the lens.

Figure 4:
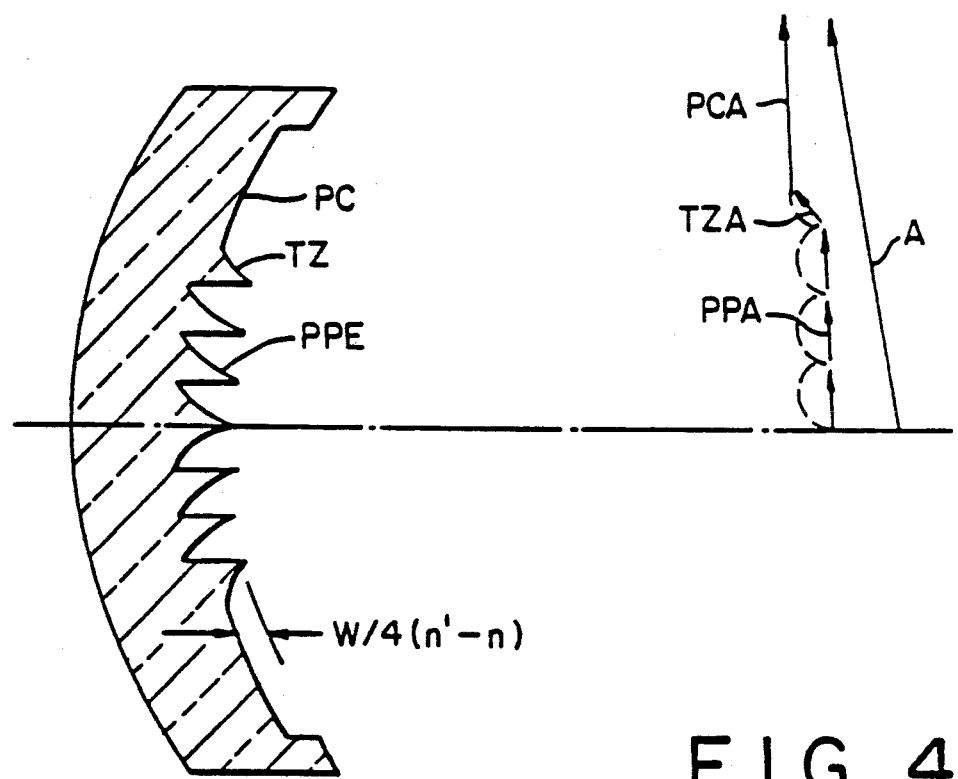
FIG. 4 depicts a cross-sectional side view of a contact lens having an optic zone which contains annular phase plate eshelettes "PPE" cut into the central portion of its base curve, and a peripheral annular phase channel, "PC", separated by an annular transition zone, "TZ". It also depicts the resultant vector amplitudes at the zeroth ($0^{th}$) order focal point.

If desired, the phase plate and phase channel may be separated by a transition zone. FIG. 4 illustrates a lens with such a transition zone separating the phase plate from the phase channel. This transition zone, as shown in the vector diagram of FIG. 4, has little effect in the overall resultant amplitude of light. As shown below, the transition zone allows the design of soft lens profiles than can compensate for those cases where the lens phase channel tends to drape to the eye.

Figure 5A:
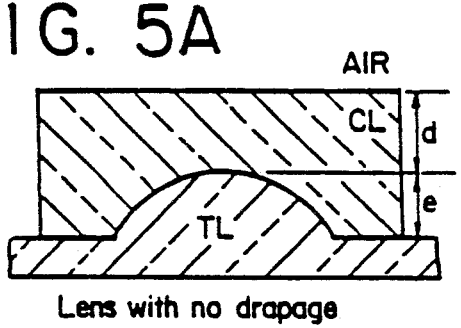
FIGS. 5A and B depict a cross-sectional side view of a soft contact lens "CL", resting upon a tear layer, "TL", showing a tear lens without drapage, and showing an air lens formed by the dimpled surface "D" when drapage occurs.
Figure 5B:
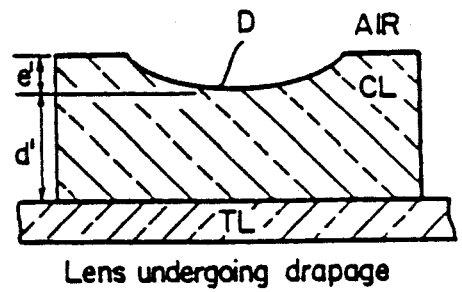

In soft contact lenses construction, it is assumed that a soft contact lens will drape upon and take the shape and form of the surface of the eye upon which it is fitted. The principles of draping are illustrated in FIGS. 5A and B. FIG. 5A depicts a soft contact lens designed to have a center thickness d and a tear layer thickness e. However, because of drapage, it is redesigned in FIG. 5B with a center thickness d' in order to account for the absence of the tear layer and the addition of an air lens formed by the depression D in the contact lens surface. The standard contact lens formulas for drapage is:

$$d' = d + e(n-1)/(n'-1)$$

Figure 6:
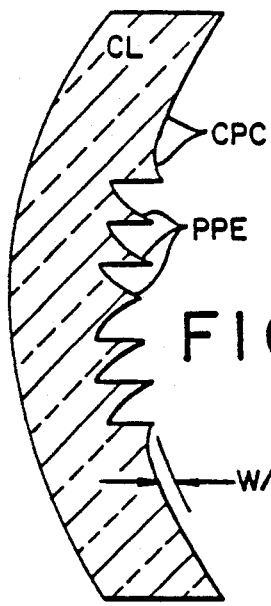
FIG. 6 depicts a cross-sectional side view of a contact lens having an optic zone which contains phase plate eshelettes "PPE" cut into the central portion of its base curve, and a drapage-compensated peripheral phase channel, "CPC".

Soft contact lenses with a transition zone may be smoothly draped upon the eye by adjusting the phase channel depth to compensate for drapage. This other embodiment of the invention is illustrated inter alias in FIG. 6. In FIG. 6, the lens is provided with a central half-wave phase plate and a phase channel at a depth of $w/4(n'-1)$ above the base curve of the lens. In this lens the peripheral portion of the base curve is cut away in order to prevent the formation of a channel and to allow for full drapage.

Figure 7:
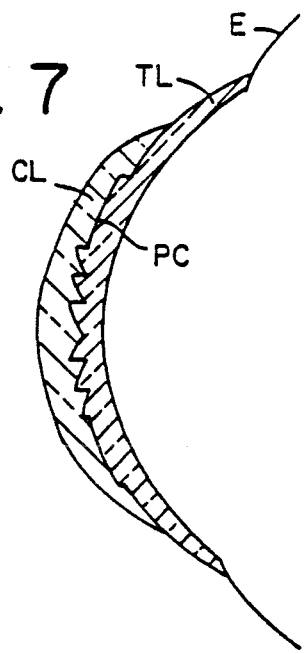
FIG. 7 depicts a cross-sectional side view of a contact lens, "CL", having an optic zone which contains a phase channel, "PC", riding upon the tear layer "TL" of eye "E".
Figure 8:
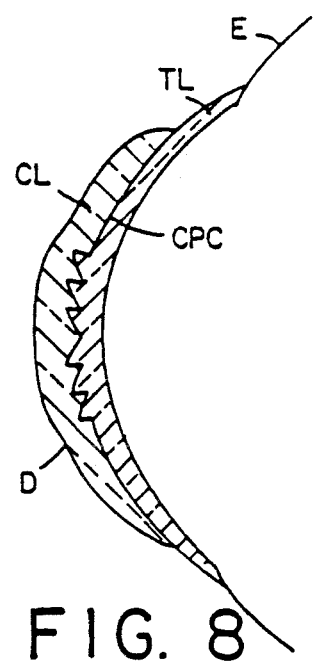
FIG. 8 depicts a cross-sectional side view of a contact lens, "CL", having an optic zone which contains a drapage-compensated phase channel, "CPC", riding upon the tear layer "TL" of eye "E". This view depicts a dip, "D", in the anterior surface of the contact lens, "CL", that occurs when the contact lens drapes on the eye.

Other illustrations of this embodiment are shown in FIGS. 7 and 8. FIG. 7 depicts a lens CL with a phase channel PC resting upon the tear layer TL of eye E. FIG. 8, on the other hand, provides lens CL with a transition zone and drapage-compensated phase channel CPC, resting upon the tear layer TL of eye E. This lens provides an annular dimple D in the anterior surface of the lens, directly above the region of drapage.

Figure 9:
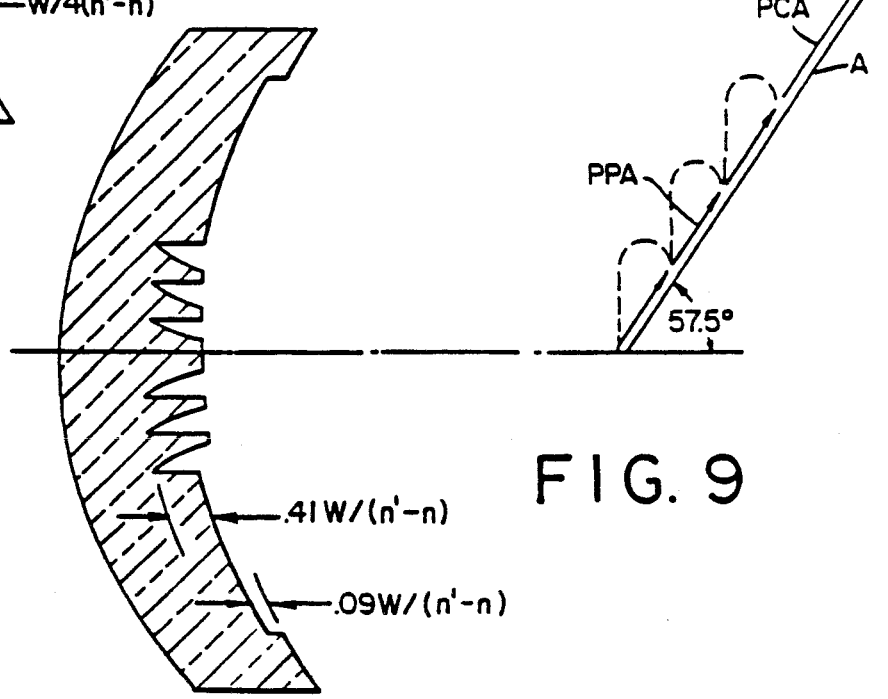
FIG. 9 depicts a cross-sectional side view of a contact lens having an optic zone which contains an alternate half wave phase plate cut into the central portion of its base curve, and a peripheral refractive phase channel. It also depicts the resultant vector amplitudes at the zeroth ($0^{th}$) order focal point.

The invention may be applied to any known type of contact lens that utilizes both diffractive as well as pure refractive elements within a single optic zone. As a particular example is the alternating half wave bifocal phase plate of FIG. 9. In this lens example, the zeroth ($0^{th}$) order diffractive focus requires a channel that imparts a phase shift equal to 90 degrees + 57.5 degrees. In this case the channel depth is determined according to the following formula:

$$\text{depth} = w(180 - 147.5)/360(n'-n) = 0.09w/(n'-n).$$

Figure 10:
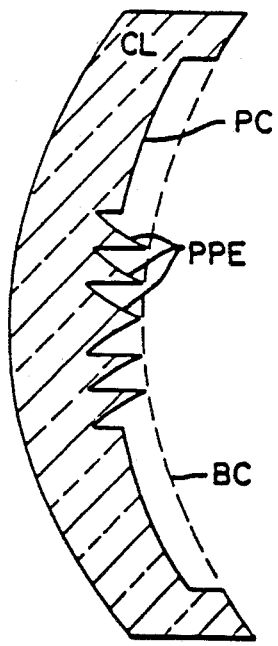
FIG. 10 depicts a cross-sectional side view of a contact lens, "CL", having an optic zone which contains phase plate eshelettes "PPE" cut into its base curve "BC", and a phase channel, "PC".

FIG. 10 illustrates a contact lens CL having a posterior surface matched to a base curve BC. Cut into the base curve centrally is a half wave phase plate with eshelettes PPE that are designed to diffract light equally to zeroth ($0^{th}$) and positive first ($1^{st}$) order diffractive focal points. The lens is provided with a phase channel by cutting, into the base posterior curve, peripherally of the phase plate, a quarter wave phase channel which refracts light to the zeroth ($0^{th}$) order diffractive focal point.

Figure 11:
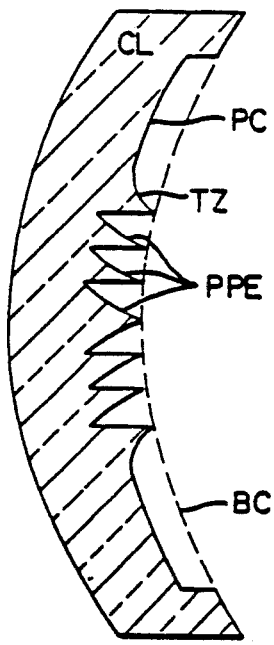
FIG. 11 depicts a cross-sectional side view of a contact lens, "CL", having an optic zone which contains phase plate eshelettes "PPE" cut into its base curve "BC", and a phase channel, "PC", separated from the phase plate by a transition zone, "TZ".

A similar lens design which includes, in addition, a transition zone to separate the phase plate from the refracting channel is depicted in FIG. 11. In this embodiment of the invention, contact lens CL whose posterior surface is matched to a base curve BC, has (i) cut into the base curve centrally, a half wave phase plate with eshelettes PPE, (ii) cut into the base curve peripherally of eshelettes PPE, a quarter wave phase channel PC, and (iii) at the point of juncture of PPE and PC, a transition zone TZ comprising one-half of a phase plate eshelette.

Figure 12:
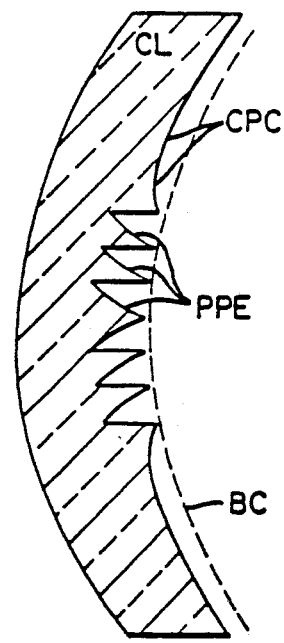
FIG. 12 depicts a cross-sectional side view of a contact lens, "CL", having an optic zone which contains phase plate eshelettes "PPE" cut into its base curve "BC", and a single compensated phase channel, "CPC", which is formed as a composite transition zone and phase channel modified to account for drapage upon the eye.

The embodiment of FIG. 12 depicts a modification of the lens of FIG. 11 by a reduction in depth of peripheral phase channel PC to compensate for lens drapage. The channel in this case has been left open in order to facilitate the desired lens drapage.

Figure 13:
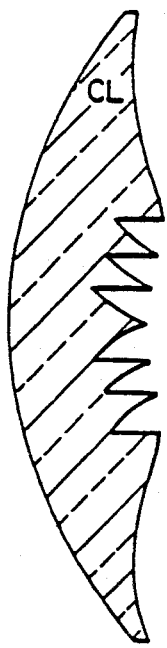
FIG. 13 depicts a cross-sectional side view of a contact lens, "CL", having an optic zone which contains a positive phase plate placed centrally together with a peripheral drapage-compensated phase channel, "CPC", designed for first ($1^{st}$) order diffraction.

FIG. 13 depicts a cross-sectional view of a contact lens CL with a positive phase plate displaced centrally with a peripherally aligned drapage-compensated annular phase channel CPC designed for first ($1^{st}$) order diffraction. The phase channel in this lens does not parallel the base curve of the lens. This follows because the phase channel provides focussed light at the first ($1^{st}$) order rather than the zeroth ($0^{th}$) order diffractive focal point illustrated in the preceding illustrations of the invention. This allows the pure refractive portion of the lens to contribute to the add power rather than to the distance power.

Figure 14:
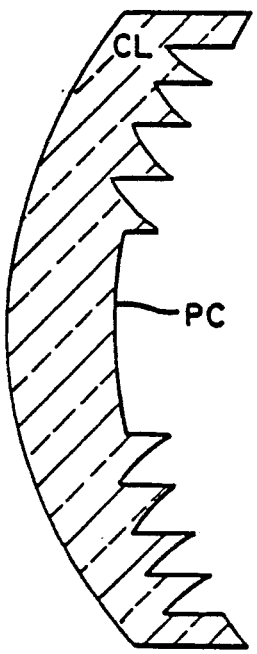
FIG. 14 depicts a cross-sectional view of a contact lens, "CL", having an optic zone which contains a positive phase plate placed peripherally of a centrally placed phase channel, "PC", designed for zeroth ($0^{th}$) order diffraction.

The embodiment of FIG. 14 depicts a cross-sectional view of a contact lens CL with a positive phase plate placed peripherally together with a central phase channel PC designed for zeroth ($0^{th}$) order diffraction.

Figure 15:
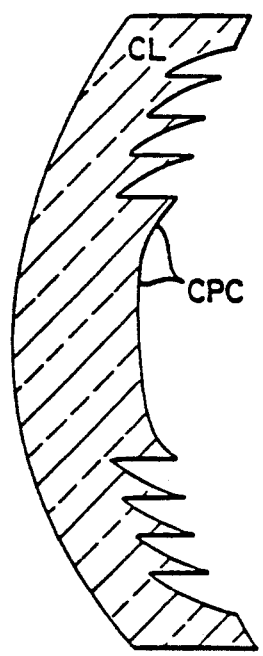
FIG. 15 depicts a cross-sectional view of a contact lens, "CL", having an optic zone which contains a negative phase plate placed peripherally together with a centrally placed drapage-compensated phase channel, "CPC", designed for zeroth ($0^{th}$) order diffraction.

The embodiment of FIG. 15 has the contact lens CL provided with a negative phase plate placed peripherally of a central drapage-compensated phase channel CPC designed for zeroth ($0^{th}$) order diffraction. It is to be noticed that the phase channel in this lens parallels the base curve of the lens and, yet, is still able to contribute to the add power rather than to the distance power. This follows from the fact that we are using a negative phase plate which provides focussed light at the zeroth ($0^{th}$) and negative first ($1^{st}$) order diffractive focal points.

A desirable lens encompassed by this invention has an optic zone of about 6 to about 8 millimeters comprising a concentric phase plate of about 4 to about 5 millimeters in diameter, viz., about 4.5 millimeters in diameter, and an annular channel having a width if about 0.5 to about 2.0 millimeters.

In those situations where the degree of mobility of the lens is extreme but the level of glare reduction achieved by the practice of the invention is considered most desirable, the lens may be modified by inclusion of the keel construction outside of the optic zone, as described in commonly owned U.S. patent application Ser. No. 120,263, filed on even date herewith, to decrease the level of mobility yet retain the advantages of the invention.

The lens of the invention may be made conventional processes in the art. For example, anhydrous versions of the base phase of a soft contact lens may be ground to provide the lens structures of the invention. Lenses may be casted from molds replicating the lens structures of the invention. The lenses may be made of glass and the conventional plastics used for making contact lenses.

I claim:

1. A lens comprising:
   a carrier lens having an anterior surface and a posterior surface, said carrier lens being disposed along an optical axis and having an optic zone;
   at least one phase zone plate disposed in said optic zone on one of said anterior and posterior surfaces substantially concentrically with said optical axis; and
   at least one refractive region, separate from said at least one phase zone plate, disposed in said optic zone substantially concentrically with said optical axis.

2. A lens as claimed in claim 1 wherein said at least one phase zone plate directs light to at least the 0th and positive 1st orders of diffraction and said at least one refractive portion directs light to at least the 0th order of diffraction.

3. A lens as claimed in claim 1 wherein said at least one phase zone plate directs light to at least the 0th and negative 1st orders of diffraction and said at least one refractive portion directs light to at least the 0th order of diffraction.

4. A lens as claimed in claim 1 wherein the lens is an ophthalmic lens.

5. A lens as claimed in claim 4 wherein the ophthalmic lens is one of an intraocular lens and a contact lens.

6. A lens as claimed in claim 1 wherein the at least one phase zone plate includes a single phase zone plate disposed along the optical axis and the at least one refractive region includes a first refractive region disposed in an annular region of the lens disposed radially outward from the optical axis and from the single phase zone plate.

7. A lens as claimed in claim 1 wherein the at least one phase zone plate includes a plurality of zones spaced substantially proportional to an integer square root of m, where m is the zone number.

8. A lens as claimed in claim 7 wherein steps are provided between each zone, said steps having a height substantially equal to one half of the design wavelength.

9. A lens as claimed in claim 1 including a transition zone between adjacent ones of the refractive regions and the phase zone plates.

10. A lens as claimed in claim 1 wherein said at least one phase zone plate is disposed on said posterior surface.

11. A lens as claimed in claim 1 wherein said at least one phase zone plate is disposed on said anterior surface.

12. A lens as claimed in claim 5 wherein the lens is a contact lens and a peripheral end of the refractive region is open so as to allow the lens to drape to the eye.

* * * * *